Figure 1:
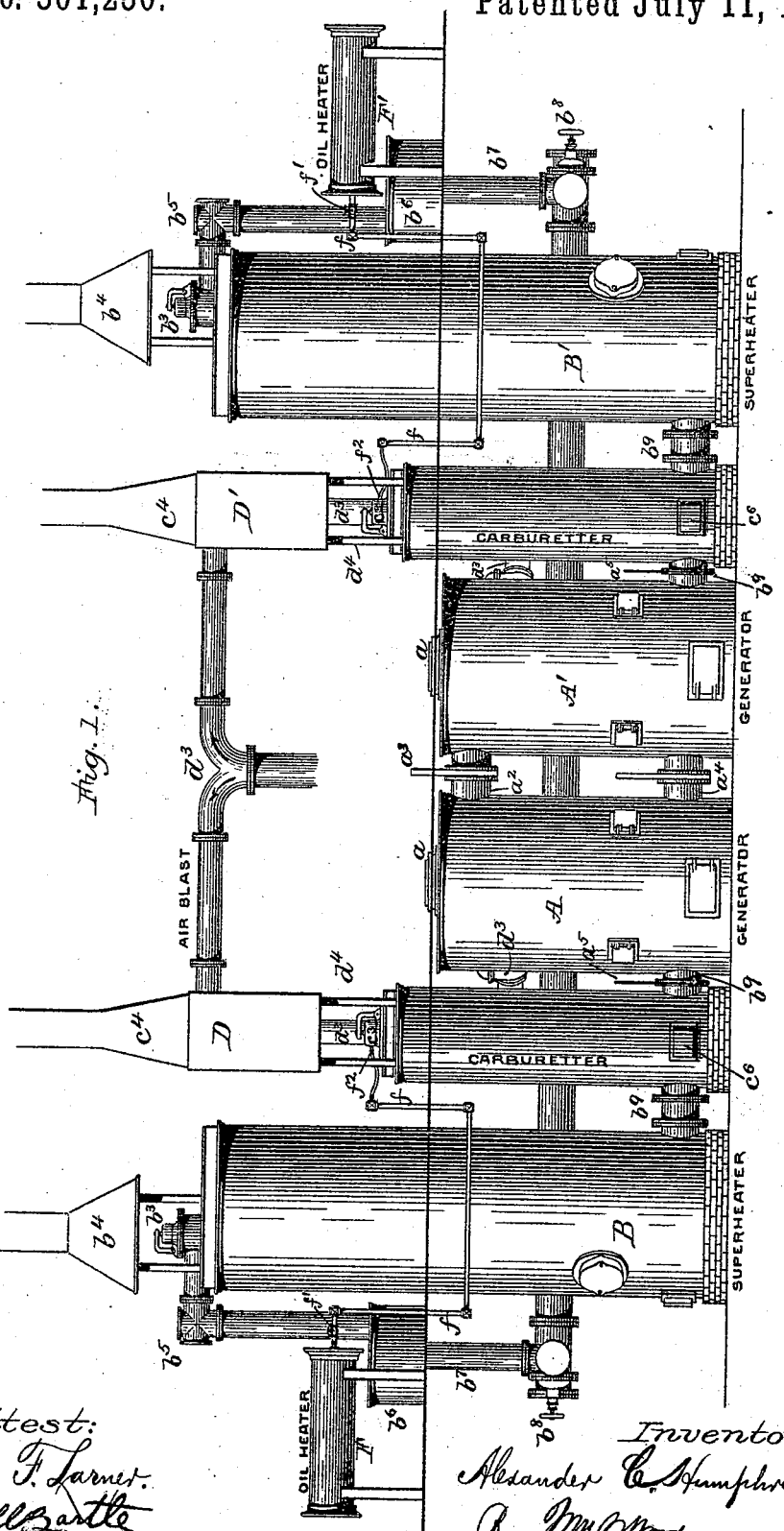

(No Model.) 6 Sheets—Sheet 2.

A. C. HUMPHREYS.
APPARATUS FOR MANUFACTURING GAS.

No. 501,250. Patented July 11, 1893.

(No Model.)  6 Sheets—Sheet 4.
A. C. HUMPHREYS.
APPARATUS FOR MANUFACTURING GAS.
No. 501,250. Patented July 11, 1893.

Attest:
Philip F. Larnet
Lowell Bartle

Inventor:
Alexander C. Humphreys.
By M. C. Wood
Attorney (No Model.) 6 Sheets—Sheet 5.

A. C. HUMPHREYS.
APPARATUS FOR MANUFACTURING GAS.

No. 501,250. Patented July 11, 1893.

Attest:
Philip F. Larner,
Nowell Bartlett

Inventor:
Alexander C. Humphreys.
By M. C. Wood
Attorney.

(No Model.) 6 Sheets—Sheet 6.

A. C. HUMPHREYS.
APPARATUS FOR MANUFACTURING GAS.

No. 501,250. Patented July 11, 1893.

Attest:
Philip F. Larner
Howell Bartte

Inventor:
Alexander C. Humphreys.
By McWood, Attorney.

UNITED STATES PATENT OFFICE.

ALEXANDER C. HUMPHREYS, OF PHILADELPHIA, PENNSYLVANIA, ASSIGNOR, BY MESNE ASSIGNMENTS, TO THE UNITED GAS IMPROVEMENT COMPANY, OF SAME PLACE.

APPARATUS FOR MANUFACTURING GAS.

SPECIFICATION forming part of Letters Patent No. 501,250, dated July 11, 1893.

Application filed December 19, 1887. Serial No. 258,358. (No model.)

*To all whom it may concern:*

Be it known that I, ALEXANDER C. HUMPHREYS, of the city and county of Philadelphia, in the State of Pennsylvania, have invented certain new and useful Improvements in Apparatus for Manufacturing Gas; and I do hereby declare that the following specification, taken in connection with the drawings furnished and forming a part of the same, is a clear, true, and complete description of the several features of my invention.

My said improvements relate to water gas manufacture, and are founded upon the well known "Lowe" methods and apparatus, fully disclosed in certain United States Letters Patent, heretofore granted to T. S. C. Lowe. My said improvements have been devised with special reference to enabling the practical and successful use of soft or bituminous coals, and the heavy oils, of which "Lima" oil is a well known type, as distinguished from the use of anthracite coal and the light oils and naphthas, ordinarily employed heretofore. I attain said ends by economically developing high temperatures, in that I reduce what may be termed waste heat to a minimum, and by so working the oils, that solid matters, residuary therefrom, are reduced to a minimum, and greatly lessening their liability to impair the incandescing capacity, of those heat affording surfaces, with which steam is brought into superheating contact, thus enabling "heating up" to be promptly accomplished, and a highly favorable degree of steam superheating, carbureting, and "fixing" duty to be performed, at each run of the apparatus. By avoiding contact of the oil with the surfaces of interior portions of the apparatus, these latter are also more readily raised to, and maintained at, favorable temperatures, for performing "fixing" duty, during the passage of water gas enriched by gasified oil. I have also for the first time, as I believe, provided for heating the carburetor by diverting a portion of the products of combustion, from the superheaters, and gas fixing chambers, leaving the main portion of said products, to pass to these last named chambers, wherein much higher temperatures should be used, than are required in the carburetor. For economizing heat, the heavy oils, before their injection to the carburetor, are heated to as high a temperature as is proper or desirable, by an exchange of heat from the outgoing gas after it leaves the fixer, thus at the same time, materially reducing the cost of cooling the gas in scrubbing and condensing. For obtaining within the carburetor, and also within the steam superheating chamber, a desirable combustion of gaseous matter while "heating up," I employ a blast of air, which is highly heated by such products of combustion, as are discharged from either said carburetor, or said superheater, or both of them, and thus economizing what would otherwise be wasted heat.

In describing my apparatus as illustrated in the drawings, the features believed to be novel, will be designated in detail, and they will also be duly specified in appropriate clauses of claim hereunto annexed.

Figure 2:
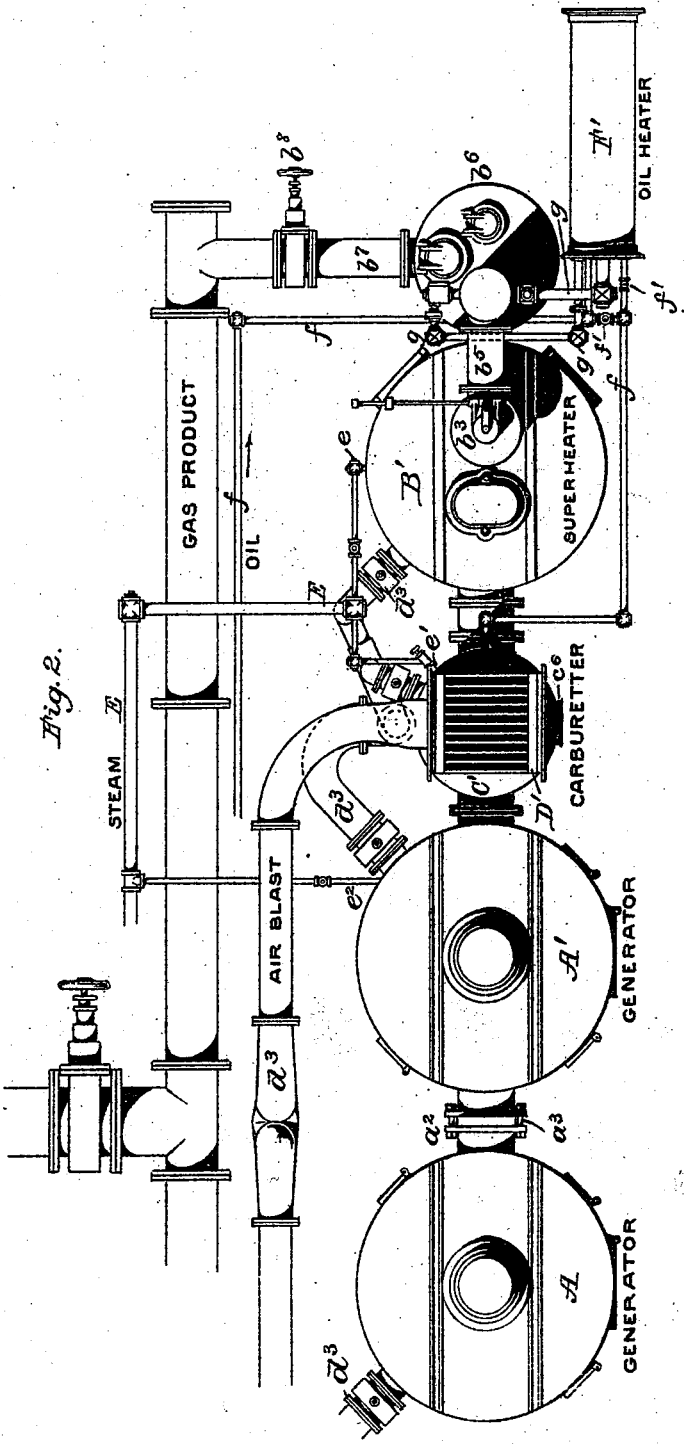
Figure 3:
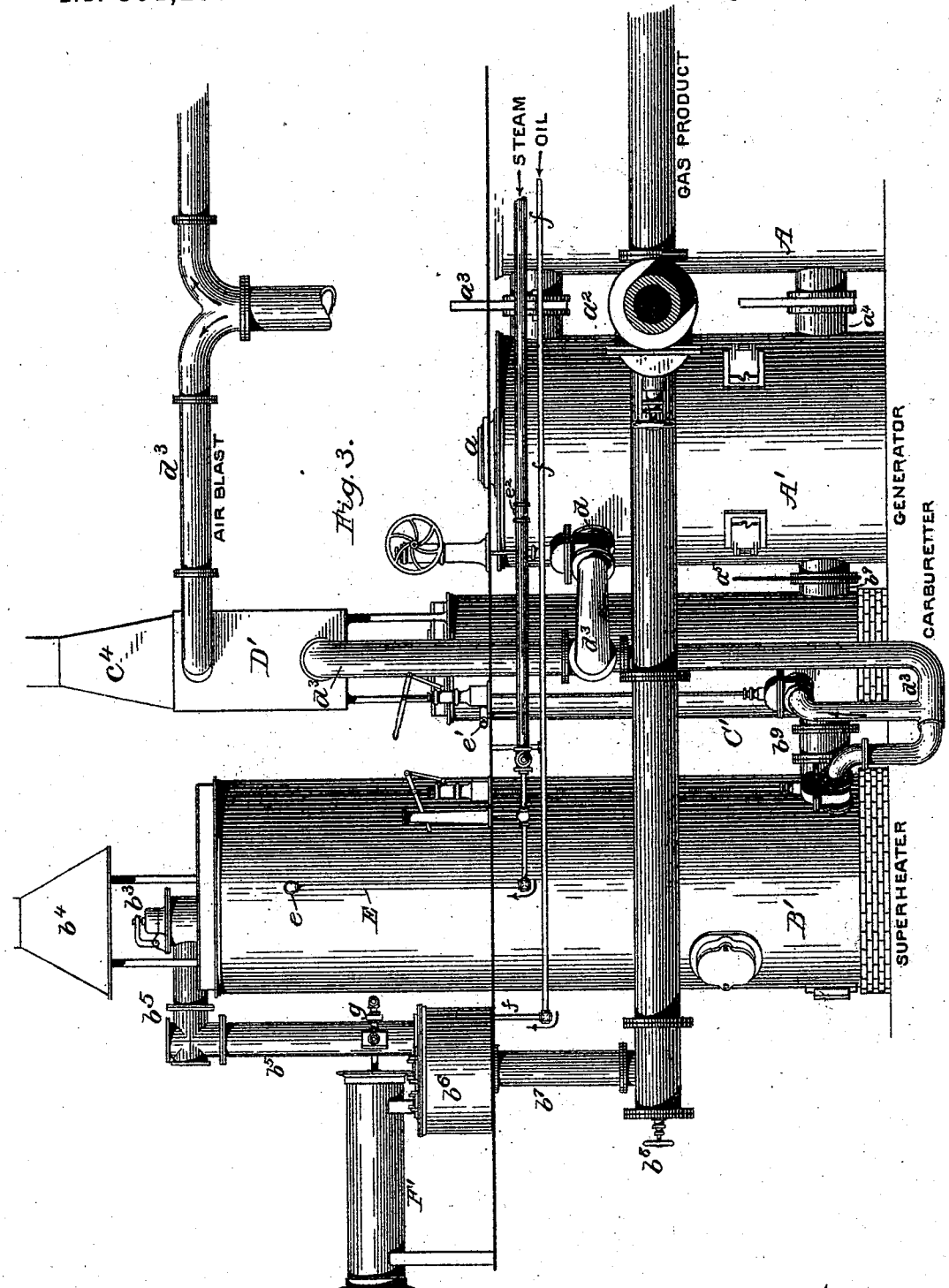
Figure 4:
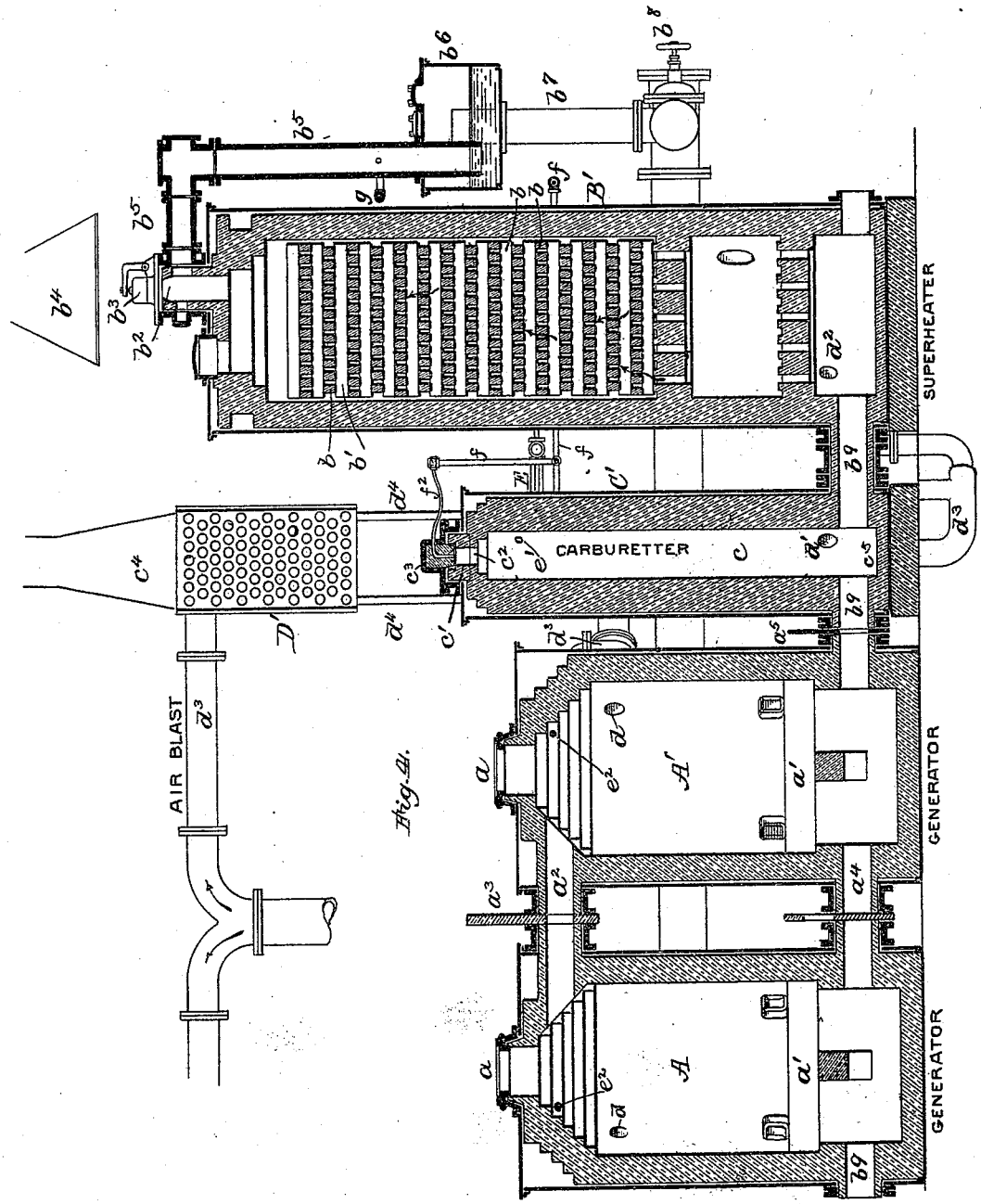
Figure 5:
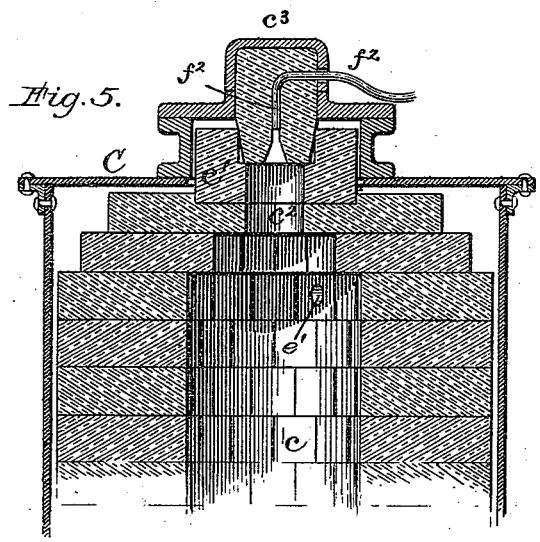
Figure 6:
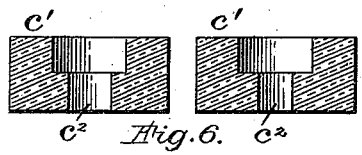
Figure 7:
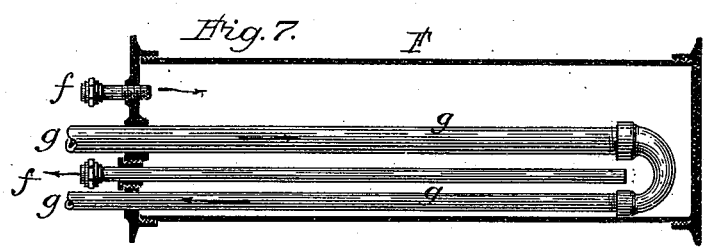
Figure 8:
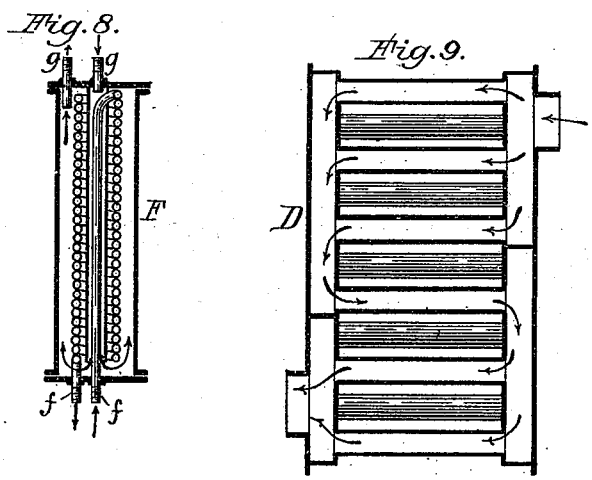
Figure 9:
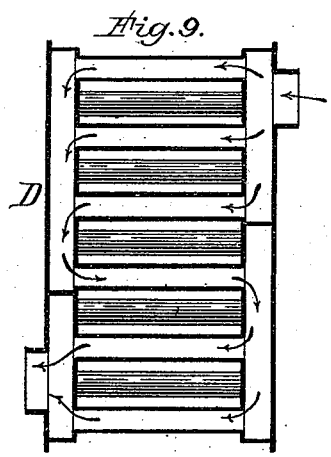
Figure 10:
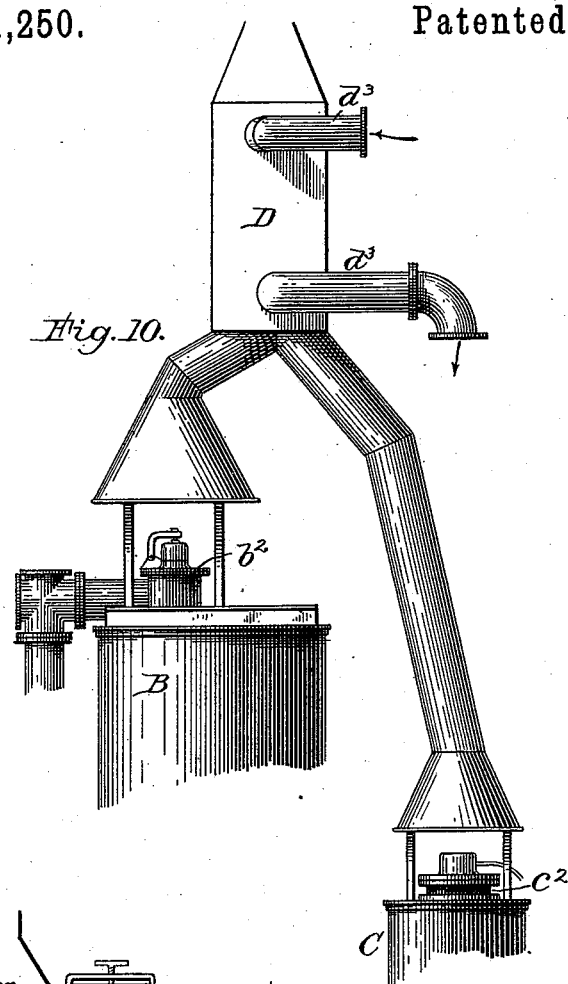
Figure 11:
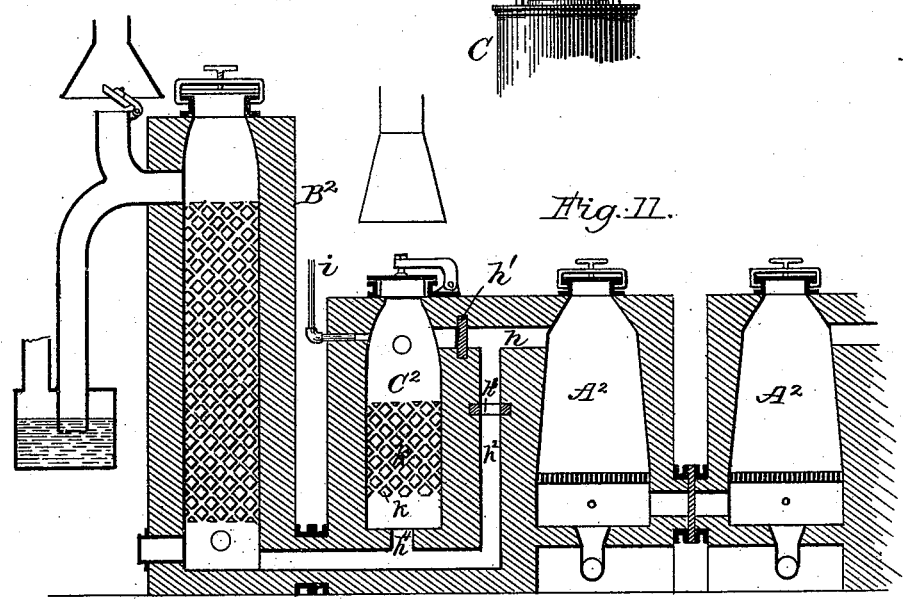

Referring to the six sheets of drawings Figure 1, illustrates in side elevation a complete double apparatus embodying my invention. Fig. 2 illustrates a little more than one half of said apparatus in top or plan view. Fig. 3 is a side elevation of one-half of the apparatus, as viewed from the side opposite to that shown in Fig. 1. Fig. 4 illustrates a portion of said apparatus in vertical central section. Fig. 5 illustrates the top of one of the carburetors in section. Fig. 6 illustrates in section, two neck pieces or throttlers used for varying the area of the exit ports of the carburetors. Fig. 7 illustrates one of the oil heaters in section, and Fig. 8 illustrates an oil heater of another form. Fig. 9 is a sectional view illustrating the interior of a suitable air heater. Fig. 10 illustrates an air heater, which is common to, and is heated by the products of combustion discharged through two exit ports. Fig. 11 in vertical section illustrates updraft generators, and a superheater, with a carburetor, which in heating up is arranged to operate in accordance with my invention.

It is to be understood that in my present use of the term "generator," I have applied it, as usual, to each of those chambers, which actually serve as furnaces, in which solid fuel is burned in "heating up," and through the incandescent contents of which, gaseous matter may be forced as an operation, alternating with each heating up operation, and further, that in the use of the term "superheater," I have applied it to each of those chambers in which steam is superheated, and also in which the gas is "fixed;" and, still further, that in the use of the term "carburetor" I have applied it to each of those chambers, to which oil is delivered, and within which, it is vaporized and partially gasified and fitted for commingling with, and enriching the water gas developed in other portions of the apparatus.

I will first describe my improved apparatus, as when organized for use in extensive gas works, and with reference to a mode of working it, for obtaining the best results, both as to economy, and quality of product. It should be understood that while I have illustrated the several parts of a double apparatus, arranged in one line or row, said particular arrangement, forms no part of my invention, and that as a rule, the two generators will be placed side by side, as shown, with the two carburetors side by side at the rear of the generators, and the two superheaters also side by side, at the rear of the carburetors. The two generators A, A', are vertical cylindrical structures, provided with tightly covered feed ports $a$, and with grates $a'$, and they communicate at their tops, by way of a lateral duct $a^2$. The two superheaters B, B', are vertical cylindrical structures, and they are properly provided internally, with many fire brick $b$, so arranged as to afford an extensive superficial area, and ample intervening passages, as at $b'$, for steam on its way to a generator, or for gas on its way through said superheater, when operating as a "fixing chamber." Each superheater has at its top, an exit or discharge port $b^2$, guarded by a valve, or gate $b^3$, readily opened and closed, and above this port, an uptake or chimney $b^4$ is provided. A pipe $b^5$ leads from the top of each superheater to a washer or seal chamber $b^6$, and a pipe $b^7$, provided with a valve or gate $b^8$, leads from said washer for conveying gas to a main or to other gas works apparatus, such as purifiers or scrubbers. At its base, each superheater communicates by way of a duct $b^9$, with the adjacent generator, and preferably with the ash pans or spaces beneath the grates $a'$. The duct $b^9$ may be a direct conduit, or it may be partially contained within the base of a carburetor as shown, but this latter arrangement, is immaterial, so long as said duct communicates with the interior of the carburetor, as will hereinafter be made apparent. The carburetors C, C', are vertical cylindrical structures, each heavily lined with fire brick, and having a tubular interior, which is unobstructed from top to bottom, and it serves as an oil gasifying or vaporizing chamber $c$. At its top said chamber is contracted, and is provided with one of a series of detachable neck pieces or throttlers $c'$, composed of fire clay, and said series of throttlers, afford annular openings of various sizes, so that the area of the exit port $c^2$, at the top of the chamber, can be varied in its dimensions, for purposes hereinafter explained. The discharge or exit port $c^2$, is guarded by a valve, gate, or cap $c^3$, which can be readily opened and closed, and above said valve and port, there is an uptake or chimney $c^4$, for conveying away the discharged products of combustion. The interior chamber $c$, of the carburetor freely communicates with the duct $b^9$, before described. At the foot of the chamber $c$, and below the line of said duct $b^9$, an annular space $c^5$, is provided for the reception of oil in the event of any accidental or undue delivery thereof to the carburetor, and an adjacent hand hole $c^6$, affords convenient access to said space, if such should ever be required. With the uptakes $c^4$, and sometimes with the uptakes or chimneys $b^4$, before described, I employ air blast heaters D, D', through which air is forced on its way to various portions of the apparatus during the operation of heating up, as will now be fully described. Each generator A and A', has near its top, a blast port $d$, thus affording a downward blast in each. Each carburetor near the junction of its interior chamber $c$, with the lateral duct $b^9$, has a blast port $d'$, and so also has each superheater near its base, a blast port $d^2$, the several blast pipes $d^3$, adjacent to each of said ports, being provided with suitable valves for graduating the blast, as well as for cutting it off entirely when proper so to do.

Steam is supplied from a suitable boiler, by way of a system of piping E, to portions of the apparatus, as follows: to the superheaters B, B', near their upper ends, by way of jet pipes $e$, and also to the carburetors, by way of jet pipes $e'$. The oil is properly heated before its use in the apparatus, by passing it in contact with the exterior surfaces of pipes traversed, by a portion of the hot gases on their way from the superheaters, (when the latter are operating as gas fixers,) to the seal washers $b^6$, or the oil may be passed through pipes exposed to the fixed hot gas. In other words, I employ oil heaters F and F', which in one form are horizontal cylindrical chambers, near the superheaters, and connected with a system of oil pipes $f$ provided with suitable cocks $f'$.

Two forms of oil heater are shown, one of which, Fig. 7, contains one or more pipes $g$, which communicate at one end with the interior of the gas conducting pipe $b^5$, near a superheater or fixer and at the other end, with the interior of a seal washer $b^6$, so that said pipes $g$, being freely traversed by the hot gas, will properly heat the contents of the oil heaters, and for enabling the quantity of gas passing through the heater to be regulated, said pipe $g$, is sometimes provided with a loose fitting valve or gate, by which a throttling effect can be therein obtained.

The oil is supplied to said heaters under pumping or other pressure, and it is delivered therefrom by the system of piping $f$, by way of jet pipes $f^2$, entering the carburetors at their upper ends, each of said pipes being flexible, and passing through the movable gate or cap $c^3$, and thereby enabling them to discharge the oil downwardly, and centrally with a minimum liability of its contact with the interior walls of chambers $c$.

In Fig. 8, an oil heater is shown, containing a coiled pipe $f$, through which the oil is conducted, the gas in this case entering freely, and passing through the chamber, and surrounding the oil conducting pipe, which may be in a to and fro arrangement, or in worm form, it being only important that a sufficient length of inclosed pipe be provided for enabling the oil to be properly heated while passing through it.

Now referring again to the generators or furnaces A. A', it is to be understood that, as thus far described, they do not differ materially from prior generators employed in the well known Lowe process apparatus, either in their construction, or in their mode of operation. The superheaters or "fixers" in their structure, do not differ materially from others, heretofore employed, but when considered in connection with a carburetor, interposed between the generator and superheater, I believe it to be new to provide both of them, with one or more air blast ports $d'$, $d^2$, whereby sufficient oxygen may be supplied for insuring combustion of gaseous matter passing through each of them, while "heating up." These carburetors differ in many respects from the similarly designated portions of any prior apparatus known to me. Neither of my said carburetors have surfaces on which the oil is deposited for vaporizing, but on the contrary in falling from the top in free space, the oil is thoroughly vaporized and partly gasified, and in that form, at the bottom of the chamber $c$, it is merged with the body of water gas on its way from the generator toward the superheater, then operating as a fixer. While I prefer to deliver the jet of oil through the center of the cap as shown, the jet pipe may be located at either side of the center, and so as to pass through the top of the carburetor, and yet afford a substantially central discharge of oil without liability of its contact with the interior walls of the carburetor. Each carburetor has a direct passage for the heating up blast; and each has its exit port at its top, and said port is graduated as to the area of opening, and near its base each carburetor has an air blast port for insuring a proper combustion of gases within the chamber $c$, while heating it.

Heretofore carburetors have been so arranged with reference to the generator, and the superheater, and so connected therewith, that the carburetor has been traversed by all of the products of combustion, on their way from the generator to the superheater, but in my apparatus, I provide, as I believe, for the first time, for diverting only so much of the heated products of combustion, from the superheater, as is actually necessary for properly heating the carburetor, and also so that either carburetor may operate for a time, as an auxiliary superheater, while the other meantime, operates only as a carburetor.

In operating the carburetor with light hydro carbons, longer runs can be made, than when heavy oils are used, under the same conditions as to the volume of heat, previously secured, and stored within the carburetor, and hence when using very heavy oils, the carburetor should have more heat stored in its walls, than when light oils are used, and in order to promptly attain the desired condition as to temperature, a full sized exit port is used, so as to enable a greater volume of gaseous matter to be burned in passing through the carburetor than would be needed, in the use of lighter oils, and hence in the latter case, a smaller sized neck piece or throttler is inserted for reducing the area of the exit port. Whether a superheater be used for superheating steam, or for fixing gas, it should be heated to a much higher temperature, than is required in the carburetor, and I have provided for so adjusting the exit port of the carburetor, that the latter need never be overheated, while properly heating up the superheater or fixing chamber.

Heretofore, carburetors have also been so arranged, that the oil is discharged directly into a rushing volume of water gas, the latter entering at the one end, and leaving at the other end of the carburetor, thus usually carrying more or less of the oil to parts of the apparatus liable to be coated or clogged with solid residuary matter, and rendering those surfaces which should be as nearly incandescent as possible, less effective, either for the superheating of steam, or for fixing gas. I am aware, however, that in another type of apparatus, retorts have been placed within so-called superheaters, and supplied with water or steam, and oil, and that the gases emanating from said retorts, have been delivered into a fixing chamber.

The oil heaters differ from any heretofore known to me, in that the oil is not thereby vaporized but heated therein to proper temperatures derived from the hot product gas, thus materially lessening the quantity of water otherwise necessary for cooling down the product gas, during the condensing and scrubbing operation.

The air blast heaters D are specially effective in that the air is raised to desirably high temperatures, by means of the heat which is discharged from the superheaters and carburetors, or either of them, and which would otherwise be wasted heat. Each air blast heater is mounted above an exit port on legs $d^4$, and is provided with interior passages for the air, and with other free interior passages opening to the uptake or chimney, so that the discharged column of the products of combustion on emerging from the exit port into the open air is freely supplied with atmospheric oxygen at the base of the heater, affording a complete combustion within said heaters, and thoroughly heating the interior air conducting passages or ducts. Other air heaters may be placed above the superheaters, or the outgoing columns of products of combustion from both, may be merged into an air heater, common to, and heated by, the products of combustion emerging from both exit ports, without departure from this portion of my invention.

In Fig. 10, I show the superheater and carburetor provided with a single uptake or chimney, and an air blast heater D, which is internally traversed by the united columns of the products of combustion discharged from both of the exit ports $b^2$ and $c^2$.

In operating the apparatus, as thus far described, to the best advantage, I proceed as follows, it being assumed that all the steam jets, and oil jets, and the valves in gas pipes beyond the seal washers, are closed; the exit ports of both superheaters and both carburetors wide open, and the generators both charged with solid fuel, such as bituminous coal, properly ignited, and their covers tightly applied. The air blast is then introduced into both generators through ports $d$, thence downward through the mass of fuel, thence laterally in two directions by way of ducts $b^9$, the main portion of the resulting hot gases passing to and through the two superheaters, and a small portion to and through each of the carburetors, the air blast being also supplied to each of these at their bases, in proper volumes, until the fuel in the generators has been raised to a proper degree of incandescence, and the superheaters and carburetors are properly heated. The air blast is then cut off, and all of the exit ports at the tops of the superheaters and carburetors are closed. One of the gates $b^8$, in the gas pipes at one end of the apparatus, is then opened, and steam is admitted to the superheater, and to the carburetor, at the opposite end of the apparatus, whenever it is deemed proper, and as the internal pressure increases, the superheated steam is forced to, and then upward through the adjacent generator, downward through the other, and thence onward, the gas being enriched in its path, by the vaporized and partly gasified oil which is discharged from the communicating carburetor (within which the oil is vaporized and partially gasified, while descending in free space), and so onward into and through the adjacent superheater, which then serves as a chamber for fixing the gases. After a "run" has been made, the steam and the oil jets are closed, the four exit ports again opened, and the hot blasts applied again to the generators, superheaters, and carburetors, until the apparatus is properly heated, (the gas valve being closed in the meantime.) Then another run is made, as described, but preferably reversing the operation of the apparatus, by opening the gas valve which was before kept closed, and injecting steam at the superheater which before served as a "fixer," and injecting oil, instead of steam, to that carburetor which before served as an auxiliary steam superheater.

The use of the air blast, highly heated, by the discharged columns of the products of combustion, contributes greatly to economy in fuel, and the same is true of pre-heating the oil; and the heating of the oil by a corresponding reduction in the temperature of the product gas, results in material economy in cooling and scrubbing in the matter of time and water, as will be apparent when it is considered, that the heat thus taken from the gas during a working day, ordinarily heats say from four to five thousand gallons of oil, to a temperature of say 400° Fahrenheit.

When the oil is injected in proper quantities into my carburetor, it cannot although discharged therein in its liquid form, engage with interior surfaces, but in falling, as it does, centrally within a cylindrical chamber which is sometimes as high as fifteen feet, and say eighteen inches in diameter, the walls of which are highly heated even to incandescence, it is thoroughly vaporized and partially gasified, before reaching the base of the carburetor, and is in prime condition to be merged with the gaseous product emanating from the superheater and the generators.

I deem it of practical value to avoid the introduction of oil in a liquid form, to passages traversed by the gases which are to be carbureted, as usually heretofore, and also to avoid permitting the oil in a liquid form to lodge upon or trickle over interior portions of an apparatus, because by so doing, I maintain all of such surfaces in prime condition, for giving out the heat desired during a run of gas, as well as for promptly assuming an incandescent or properly heated condition, while heating up the apparatus; and it will be found also that linings, checker brick, &c., both in the carburetors and superheaters or "fixers" will do much longer effective duty, than when they are exposed to the reception of solid residuary matters, always incident to the contact of oil therewith.

While I prefer in the matter of economy, and quality of product, to employ my apparatus in its doubled form, as indicated, it must not be assumed that certain features of my invention, are restricted to said "double form," because my double apparatus is sometimes arranged so as to enable it to be operated as two separate organizations, or so that I can operate either, while the other is at rest, with satisfactory results. As for instance, the duct $a^2$, is provided with any suitable gate at $a^3$, thus enabling communication between the generators A and A', to be wholly closed. A steam jet pipe $e^2$ enters each generator near its top.

In operating either half of the apparatus singly, communication between the generators is wholly cut off, and either generator is supplied with the hot blast, and raised to a proper heat, meantime heating up the communicating superheater and also the carburetor, after which the air blast is cut off, and the exit ports $b^2$, and $c^2$, closed. Steam is then forced through the incandescent mass of fuel in the generator; the carburetor is operated as when working "double," but the superheater proper, then operates only as a "fixer," and my oil heater operates as before described in materially cooling the outgoing gas. Even if the apparatus be only operated "double," the occasional injection of steam into the generators will be desirable for preventing "clinker" from forming therein.

Having thus provided for separately operating both halves of the apparatus, I have still further provided for operating both generators in conjunction with either superheater, and the carburetor adjacent thereto. This is accomplished as follows: The ash pans or spaces below the grates of the generators communicate with each other at a gate guarded port $a^4$, and each duct $b^9$ near its entrance to said spaces, is provided with a gate $a^5$, for cutting off communication with the generators. Both generators having been supplied with fuel properly ignited, and the duct $a^4$ opened, the blast is applied to both, passing downward therein, through the fuel, into the ash pans, and forcing the heat from both, into say the right hand duct $b^9$, and into and through the right hand carburetor and superheater, until a proper heat has been obtained, whereupon the blast is cut off, and the exit ports $b^2$ and $c^2$ closed; steam is then admitted to both generators, and oil supplied to the right hand carburetor, the right hand superheater then serving as a "fixer." It will be readily obvious that both generators can in like manner be operated in connection with the left hand carburetor and superheater. This mode of working would be advisable in the event of either superheater or carburetor being unfit for duty, but the use of both generators, for decomposing steam, would of course be more effective than if but one were used.

In large gas works, which will warrant the use of several apparatuses of the double type, and enable one or more to be held in "ordinary" for emergencies, as when others need repairs, no provision need be made for variations in modes of working, but for use in small gas works, it will be found desirable to employ a "double" apparatus, which will be susceptible of one or more modes of working separate portions thereof, for enabling repairs to be meanwhile attended to in other portions thereof, without seriously affecting the continued manufacture of gas, or its quantity, and quality, although for obtaining the best results as to economy and quality, the "double" apparatus should be used and operated in the manner previously described.

In an emergency, as say in the event of one carburetor and its adjacent superheater or fixer being unfit for use, the two generators may be employed for heating up the other carburetor and superheater, and steam admitted to the latter, which after being carbureted would be passed through both generators, and delivered from the idle superheater or fixer, this then serving only as a conduit for the product gas.

It will be obvious that more or less of the advantages accruing from heating up carburetors, by means of diverted portions of the products of combustion, while permitting the main portions of said heating products to proceed to a superheater, or to a gas fixing chamber, can be variously obtained, even if the interior of the carburetor be occupied by checker brick, and also even if the volume of water gases be entered at the top, and passed from the bottom of the carburetor to the fixing chamber, as usually heretofore. As, for instance, in Fig. 11, I show generators $A^2$, and a superheater $B^2$, similar to those illustrated in Letters Patent to Granger and Collins—No. 287,277, October 23, 1883. The carburetor $C^2$, here shown, is filled with checker brick, as in said patented apparatus, but it is here organized, so that it can be operated while heating up either as in said patent, or in accordance with this portion of my present invention. This carburetor $C^2$ has a port and cover at its top, and so it has in said prior apparatus, but in that case, it was a mere manhole, while now it serves as an exit or discharge port for the products of combustion. This generator $A^2$ is blown at the bottom, and the heat passes out near the top through a duct $h$, and in said prior apparatus it passes directly into the carburetor, down through it, and out at or near its base, into the base of the superheater, or "fixer" $B^2$. I now place a gate $h'$, in said duct $h$, and provide a diving flue $h^2$, which passes from said duct $h$, downward and horizontally beneath the carburetor, and to the base of the fixer, and in this flue $h^2$, I place a gate $h^3$. The flue $h^2$ communicates with the carburetor $C^2$, by way of a port $h^4$. Oil of the naphtha variety is admitted by pipe $i$ and sprayed at proper time upon the checker brick $k$. If the gate $h'$, be opened, and the gate $h^3$, closed, and the top of the carburetor closed, the operation of heating up, will be precisely as in said prior patent, and all of the heated products of combustion will pass through the carburetor on their way to the chamber $B^2$. If, however, the gate $h^3$, be opened, and the gate $h'$, closed, and the top of the carburetor opened, the heat will be driven below the carburetor, and only so much will be diverted into, and permitted to pass through said carburetor, as can escape through the properly throttled open exit port at the top, and the main body of the products of combustion, will pass directly onward to the chamber $B^2$ where it is most needed, precisely as in my apparatus previously described. After heating up the apparatus, steam is applied beneath the grate in the generator, and the resultant gases may pass into duct $h$ (gate $h'$ being open and gate $h^2$ closed), and thence down through the checker brick, (while oil is being injected into the carburetor,) and thence to the fixing chamber $B^2$, so that this part of the operation will be as described in said Letters Patent. In apparatus of this type, this heating up feature of my invention, is specially desirable, because the carburetor need never be overheated, and only the required quantity of heat diverted from the fixing chamber whether the latter is or is not organized to also operate as a superheater. It is of course to be understood that the checker brick and the oil pipe arrangement shown at $C^2$ in Fig. 11, would be unsuited for working heavy oils, which must not be allowed to fall upon or to drip over walls or surfaces within a carburetor. Now by removing the checker brick from the carburetor, and placing the oil jet substantially centrally at the top thereof, another feature of my invention would be involved, because the oil would then be vaporized and partially gasified while falling in free space, and without contact with interior surfaces, and at the base of the carburetor, it would be merged with the gas from the generators, if the gate $h'$ were closed, and gate $h^3$ opened, thus causing this apparatus to then operate in this respect, like mine as previously described.

Having thus described my invention, I claim as new and desire to secure by Letters Patent—

1. In a gas making apparatus, the combination substantially as hereinbefore described, of a generator and superheater having a duct or passage which connects said generator and superheater and is alternately occupied by heated products of combustion on their way from the chamber which is supplied with solid fuel, and by superheated or decomposed steam on its way to a fixing chamber, and a vertical carbureting chamber communicating at its base only, with said duct, and provided at its top with an oil supply pipe, and with an exit port provided with a valve or gate, whereby when said exit port is opened, said chamber will be heated by a diverted portion of the products of combustion supplied by the generator, passing directly through it from its base to and outward through its open top, and also whereby when said port is closed, and oil injected, the oil will be vaporized and partly gasified and merged at the base of said chamber, with decomposed or superheated steam while passing through said duct.

2. In a gas making apparatus, the combination substantially as hereinbefore described, of a generator, and a fixing chamber; a duct which affords the sole communication between the generator and fixing chamber; and a vertical carburetor which has at its top a valve guarded port and an oil injecting pipe, and which communicates at its base with said duct, whereby in heating up the apparatus, all of the hot products of combustion will pass to the fixer through said duct except when the top of the carburetor is opened, for permitting a portion of said hot products to pass upwardly therein, and also whereby gaseous matter delivered from said generator will pass through the same duct to the fixer and be carbureted in its passage thereto.

3. In a gas making apparatus, the combination substantially as hereinbefore described, of a down draft generator or furnace to which solid fuel is supplied, a chamber provided with a steam injection pipe and checker brick for rendering it capable of operating either as a steam superheater, or as a fixing chamber, through which the products of combustion are mainly conducted while heating up the apparatus, and a carburetor, provided with an oil injection pipe, and interposed between said generator and said chamber, communicating at its base only with the bases of both, and provided at its top with a valve guarded exit port.

4. In a gas making apparatus, the combination substantially as hereinbefore described, of a pair of closed down draft generators, each having an air blast port above the grate, and an exit port below said grate, and to which solid fuel is supplied, and which communicate with each other at their tops; two chambers, in both of which steam may be superheated and gas fixed; each chamber at its base connected by a duct with the base of an adjacent generator; and between each generator and its superheater or gas fixer, a vertical carbureting chamber, communicating at its base with said duct, and provided at its top with a valve guarded exit port, whereby in heating up the apparatus, both carburetors may be properly heated by means of diverted portions of the products of combustion proceeding from the generators, while the main portions thereof pass to and through the superheating and gas fixing chambers, and also whereby either carburetor on being supplied with oil, will enrich gases after their passage from either superheater, through both generators, and while passing laterally through or across the interior of the carburetor near its base, on their way to the superheater then operating as a fixing chamber.

5. In a gas making apparatus, embodying duplicate carburetors, each provided at its top with an oil injecting pipe and a guarded port and duplicate superheaters, each of the latter provided with a valve guarded port at its top and with a steam injection pipe, and each capable of operating as a fixing chamber, the combination of a pair of generators which are coupled at their tops, by a duct provided with a gate, and a steam jet pipe in each generator, each of said generators being in communication with carburetors, and with a superheater or fixing chamber, substantially as described whereby the heating of the carburetors and the superheaters may be separately controlled, and also whereby when said generators are in open communication, steam may be superheated in either superheater, and conducted therefrom through both generators, then enriched by the contents of one carburetor, and the gases fixed in the other superheater, or by closing the said duct, enabling each generator to operate as a steam decomposing chamber, and the superheater which is connected therewith, to operate only as a fixing chamber.

6. In a gas making apparatus, the combination substantially as hereinbefore described, of the two generators, the two superheaters, provided with steam injecting pipes, and operating either for superheating steam, or as fixing chambers, and two carburetors, each intervening between a superheater and a generator, and provided with oil injecting pipes, and also with steam injection pipes, whereby while either carburetor is being supplied with oil, the other may be used for superheating steam and to co-operate with one of said superheaters.

7. In a gas making apparatus, the combination substantially as hereinbefore described, of a generator, to which solid fuel is supplied, a chamber in which steam may be superheated, or gas fixed, a duct connecting the bases of said generator and chamber, a carburetor provided with a steam injection pipe and communicating at its base with said duct, and provided at its top with a valve guarded exit port, and air blast ports at the bases of said chamber and carburetor, whereby in heating up the apparatus, appropriate portions of the heated products of combustion may be directed into and through said chamber and said carburetor, and each appropriately supplied with air for securing good combustion of gaseous matter therein.

8. In a gas making apparatus, the combination substantially as hereinbefore described, of the two generators or furnaces, communicating at top and bottom, valves or gates for controlling said communication, a carburetor and a superheater communicating with each other, and with one of said generators at its base, a similar carburetor and a similar superheater communicating in like manner with the other generator, and valves or gates for controlling said communication, whereby after heating up both generators, and either carburetor, and its communicating superheater (to enable it to operate as a fixing chamber), steam may be decomposed in either or both of said generators, and delivered to the heated carburetor and superheater or fixing chamber, while the other carburetor and superheater are wholly out of service.

9. In a gas making apparatus, the combination substantially as hereinbefore described, with a generator and a superheater and fixer of a carburetor having at its top a valve guarded exit port, and connected at its base with a duct for directing heated products of combustion thereto, and also having said port adapted to receive either of a series of annular neck pieces or throttlers of various sizes for varying the area of said port, whereby the heated products of combustion passing through said carburetor may be graduated to its proper requirements, and obviate the wasteful diversion of heat from other portions of the apparatus, such as superheaters, or fixers, or both, and also whereby overheating of said carburetor may be obviated while properly heating said other portions.

10. In a gas making apparatus, the combination substantially as hereinbefore described, of the vertically unobstructed carbureting chamber into which oil in liquid form is delivered, and within which the oil while falling in space is vaporized for carbureting purposes; the chamber in which the carbureted gas is fixed; and an oil heater communicating with, and affording a passage for hot product gas discharged from the fixer, and also communicating with the top of the vertically unobstructed carbureting chamber, whereby the temperature of the product gas is reduced, and oil in its passage through said heater is not vaporized, but raised to a desirable temperature suitable for delivery in its liquid form into the carbureting chamber.

11. In a gas making apparatus, the combination substantially as hereinbefore described, of two generators, provided with air blast ports above their grates, and communicating with each other by way of a passage at the bottom below the grates, a valve or gate for controlling said passage, a carburetor and a gas "fixer" both communicating with each other, and with said generators below their grates, whereby either of said generators may be wholly relied upon for co-operating with said carburetor and "fixer," or both of them made to jointly co-operate therewith.

ALEX. C. HUMPHREYS.

Witnesses:
WILLIAM J. SERRILL,
MINTURN T. WRIGHT.